(12) United States Patent
Wang et al.

(10) Patent No.: US 12,552,679 B2
(45) Date of Patent: Feb. 17, 2026

(54) PREPARATION METHOD OF NANO ALUMINUM OXIDE (NANO-AL₂O₃) WITH CONTROLLABLE HYDROXYL CONTENT AND USE THEREOF

(71) Applicant: Kunming University of Science and Technology, Kunming (CN)

(72) Inventors: Fei Wang, Kunming (CN); Kai Li, Kunming (CN); Ping Ning, Kunming (CN); Zhao Li, Kunming (CN); Xin Sun, Kunming (CN); Yixing Ma, Kunming (CN); Chi Wang, Kunming (CN)

(73) Assignee: Kunming University of Science and Technology Kunming, Kunming (CN)

( * ) Notice: Subject to any disclaimer, the term of this patent is extended or adjusted under 35 U.S.C. 154(b) by 455 days.

(21) Appl. No.: 18/124,792

(22) Filed: Mar. 22, 2023

(65) Prior Publication Data

US 2023/0303402 A1    Sep. 28, 2023

(30) Foreign Application Priority Data

Mar. 24, 2022   (CN) .......................... 202210297506.8

(51) Int. Cl.
*C01F 7/34*   (2006.01)

(52) U.S. Cl.
CPC ............ *C01F 7/34* (2013.01); *C01P 2004/64* (2013.01); *C01P 2006/82* (2013.01)

(58) Field of Classification Search
CPC ...... C01F 7/34; C01F 7/02; C01F 7/30; C01P 2004/64; C01P 2006/82; C01P 2002/72;

(Continued)

(56) References Cited

FOREIGN PATENT DOCUMENTS

| CN | 109261105 A |   | 1/2019 |          |
|----|-------------|---|--------|----------|
| CN | 113648408   | * | 11/2021 | ............... C01F 7/34 |
| CN | 113648408 A |   | 11/2021 |          |

OTHER PUBLICATIONS

Ramanathan, et al., Alumina Powders from Aluminium Nitrate-Urea and Aluminium Sulphate-Urea Reactions—The Role of Precursor Anion and Process Conditions on Characteristics, Ceramics International 1997; 23: 45-53 (Year: 1997).*

(Continued)

*Primary Examiner* — Daniel C. McCracken
(74) *Attorney, Agent, or Firm* — Gearhart Law LLC

(57) ABSTRACT

The present disclosure provides a preparation method of nano-aluminum oxide (nano-Al₂O₃) with a controllable hydroxyl content, belonging to the technical field of nano-alumina. $H_2O_2$ dissolved in water dissociates a large number of hydroxyl radicals. In the present disclosure, a resulting $H_2O_2$ solution is used as a solvent for precipitation; during the precipitation, a soluble aluminum salt and a pore-enlarging agent are reacted to generate a precipitate under alkaline conditions, and the hydroxyl radicals are distributed on a surface of the precipitate. During drying, the hydroxyl radicals are converted into bound water and distributed on a surface and in pores of an aluminum hydroxide precursor; during roasting, the bound water is destroyed to form hydroxyl. The hydroxyl content of the nano-$Al_2O_3$ can be regulated by controlling a concentration of the $H_2O_2$ solution, and the nano-$Al_2O_3$ has the hydroxyl content positively correlated with the concentration of the $H_2O_2$ solution.

10 Claims, 10 Drawing Sheets

(58) Field of Classification Search
CPC ...... C01P 2004/04; B01J 23/002; B01J 23/50; B82Y 30/00; B82Y 40/00
See application file for complete search history.

(56) References Cited

OTHER PUBLICATIONS

Huang, et al., Enhanced surface hydroxyl groups by using hydrogen peroxide on hollow tubular alumina for removing fluoride, Microporous and Mesoporous Materials 2020; 297: 110051, pp. 1-10 (Year: 2020).*
Wang, et al., Resolving the puzzle of single-atom silver dispersion on nanosized =-Al2O3 surface for high catalytic performance, Nature Communications 2020; 11: 529, pp. 1-9 with Supplementary Information (Year: 2020).*
Reid, et al., A study in the mechanical milling of alumina powder, Ceramics International 2008; 34: 1551-1556 (Year: 2008).*
Definition of "correlated," accessed online at https://www.merriam-webster.com/dictionary/correlated on Aug. 15, 2025 (Year: 2025).*
Definition of "phenomenon," accessed online at https://www.merriam-webster.com/dictionary/phenomenon on Aug. 15, 2025 (Year: 2025).*
Fei Wang, Promoting effect of acid sites on NH3-SCO activity with water vapor participation for Pt—Fe/ZSM-5 catalyst, ScienceDirect, Catalysis Today, Jun. 13, 2020, 7, Elsevier, China.
Fei Wang, Resolving the puzzle of single-atom silver dispersion on nanosized γ-Al2O3 surface for high catalytic performance, Nature Communications, Jan. 27, 2020, pp. 311-317, vol. 376, Nature Communications, China.

* cited by examiner

PREPARATION METHOD OF NANO ALUMINUM OXIDE (NANO-AL$_2$O$_3$) WITH CONTROLLABLE HYDROXYL CONTENT AND USE THEREOF

CROSS REFERENCE TO RELATED APPLICATION

This patent application claims the benefit and priority of Chinese Patent Application No. 202210297506.8, filed with the China National Intellectual Property Administration on Mar. 24, 2022, the disclosure of which is incorporated by reference herein in its entirety as part of the present application.

TECHNICAL FIELD

The present disclosure relates to the technical field of nano-alumina, in particular to a preparation method of nano-aluminum oxide (nano-Al$_2$O$_3$) with a controllable hydroxyl content.

BACKGROUND

In the field of various catalytic redox, differences in the performance of a carrier generally leads to different dispersion of the main active species in a catalyst on the carrier, thus eventually causing differences in the performance of the catalyst. According to the research of papers such as "Resolving the puzzle of single-atom silver dispersion on nano-sized gamma-Al$_2$O$_3$ surface for high catalytic performance" and "Promoting effect of acid sites on NH$_3$—SCO activity with water vapor participation for Pt—Fe/ZSM-5 catalyst", various active components can be anchored on the surface of the carrier by linking with hydroxyl groups. When there are limited hydroxyl groups, the loaded active components may have no anchoring sites and thus aggregate to form nanoparticles of a certain particle size; while when there are more hydroxyl groups, sufficient anchoring sites may be provided for the active components to form single-atom or cluster catalysts. However, in most redox reactions, even catalysts composed of the same type of carrier and the same type of active components under the same loading may form single-atom catalysts, cluster catalysts, and nanoparticle catalysts with considerable differences in the catalytic performance.

Nano-alumina is a widely used catalyst carrier. However, due to the uncertainty of hydroxyl content, it is difficult to synthesize catalysts with different dispersities according to the catalyst application using the current commercial nano-alumina. Patent CN109261105A disclosed a nano-Al$_2$O$_3$ material and a preparation method thereof. In this method, the required hydrothermal synthesis results in a low yield of the nano-Al$_2$O$_3$, as well as an uncontrollable hydroxyl content on the alumina surface. Patent CN113648408A disclosed a preparation method of a rice grain-shaped nano-Al$_2$O$_3$ adjuvant with desirable suspension stability. The nano-Al$_2$O$_3$ adjuvant prepared by this method has homogeneous appearance, uniform dispersion, and excellent homogeneity and immunogenicity; however, the adjuvant has a complicated synthesis method, which can only make the surface of alumina rich in hydroxyl groups, and cannot obtain nano-alumina with a low hydroxyl content.

SUMMARY

In view of this, an objective of the present disclosure is to provide a preparation method of nano-Al$_2$O$_3$ with a controllable hydroxyl content. The preparation method is simple and can regulate the hydroxyl content on a surface of the nano-Al$_2$O$_3$.

To achieve the above objective of the present disclosure, the present disclosure provides the following technical solutions.

The present disclosure provides a preparation method of nano-Al$_2$O$_3$ with a controllable hydroxyl content, including the following steps:

mixing a soluble aluminum salt and a pore-enlarging agent with a H$_2$O$_2$ solution, adjusting a pH value of a resulting mixture to 8 to 9 with an alkaline solution, and conducting precipitation to obtain a precipitate;

drying the precipitate to obtain an aluminum hydroxide precursor; and conducting roasting on the aluminum hydroxide precursor to obtain the nano-Al$_2$O$_3$; where the H$_2$O$_2$ solution has a concentration of 0 wt % to 36 wt %, and the nano-Al$_2$O$_3$ has a hydroxyl content positively correlated with the concentration of the H$_2$O$_2$ solution.

Preferably, the alkaline solution includes H$_2$O$_2$ with a concentration of 0 wt % to 36 wt %.

Preferably, the soluble aluminum salt is one or more selected from the group consisting of Al(NO$_3$)$_3$·9H$_2$O, Al(NO$_3$)$_3$·6H$_2$O, NaAlO$_2$, AlPO$_4$, Al$_2$(SO$_4$)$_3$, and AlCl$_3$.

Preferably, the pore-enlarging agent is one or more selected from the group consisting of sodium dodecyl benzene sulfonate (SDBS), trimethylbenzene, urea, and urotropine.

Preferably, the mixture of the soluble aluminum salt, the pore-enlarging agent, and the H$_2$O$_2$ solution has 0.1 mol/L to 2 mol/L of the soluble aluminum salt by concentration.

Preferably, the soluble aluminum salt and the pore-enlarging agent have a mass ratio of 1:(0.0001-0.1).

Preferably, the precipitation is conducted for 0.5 d to 5 d.

Preferably, the drying is conducted at 90° C. to 110° C. for 0.5 d to 14 d.

Preferably, the roasting is conducted at 300° C. to 1,100° C. for 3 h to 9 h.

Preferably, the preparation method further includes conducting ultrasonic cleaning on a roasted product at 100 kHz to 200 kHz for 10 min to 2 h.

The present disclosure provides a preparation method of nano-Al$_2$O$_3$ with a controllable hydroxyl content, including the following steps: mixing a soluble aluminum salt and a pore-enlarging agent with a H$_2$O$_2$ solution, adjusting a pH value of a resulting mixture to 8 to 9 with an alkaline solution, and conducting precipitation to obtain a precipitate; drying the precipitate to obtain an aluminum hydroxide precursor; and conducting roasting on the aluminum hydroxide precursor to obtain the nano-Al$_2$O$_3$; where the H$_2$O$_2$ solution has a concentration of 0 wt % to 36 wt %, and the nano-Al$_2$O$_3$ has a hydroxyl content positively correlated with the concentration of the H$_2$O$_2$ solution. H$_2$O$_2$ dissolved in water dissociates a large number of hydroxyl radicals. In the present disclosure, a resulting H$_2$O$_2$ solution is used as a solvent for precipitation; during the precipitation, a soluble aluminum salt and a pore-enlarging agent are reacted to generate a precipitate under alkaline conditions, and the hydroxyl radicals are distributed on a surface of the precipitate. During drying, the hydroxyl radicals are converted into bound water and distributed on a surface and in pores of an aluminum hydroxide precursor; during roasting, the bound water is destroyed to form hydroxyl. The hydroxyl content of the nano-Al$_2$O$_3$ can be regulated by controlling a concentration of the H$_2$O$_2$ solution, and the nano-Al$_2$O$_3$ has the hydroxyl content positively correlated with the concentration of the $H_2O_2$ solution. Moreover, the preparation method has a simple process and a low cost, which is easy to realize industrialized mass production.

DETAILED DESCRIPTION OF THE EMBODIMENTS

Figure 1:
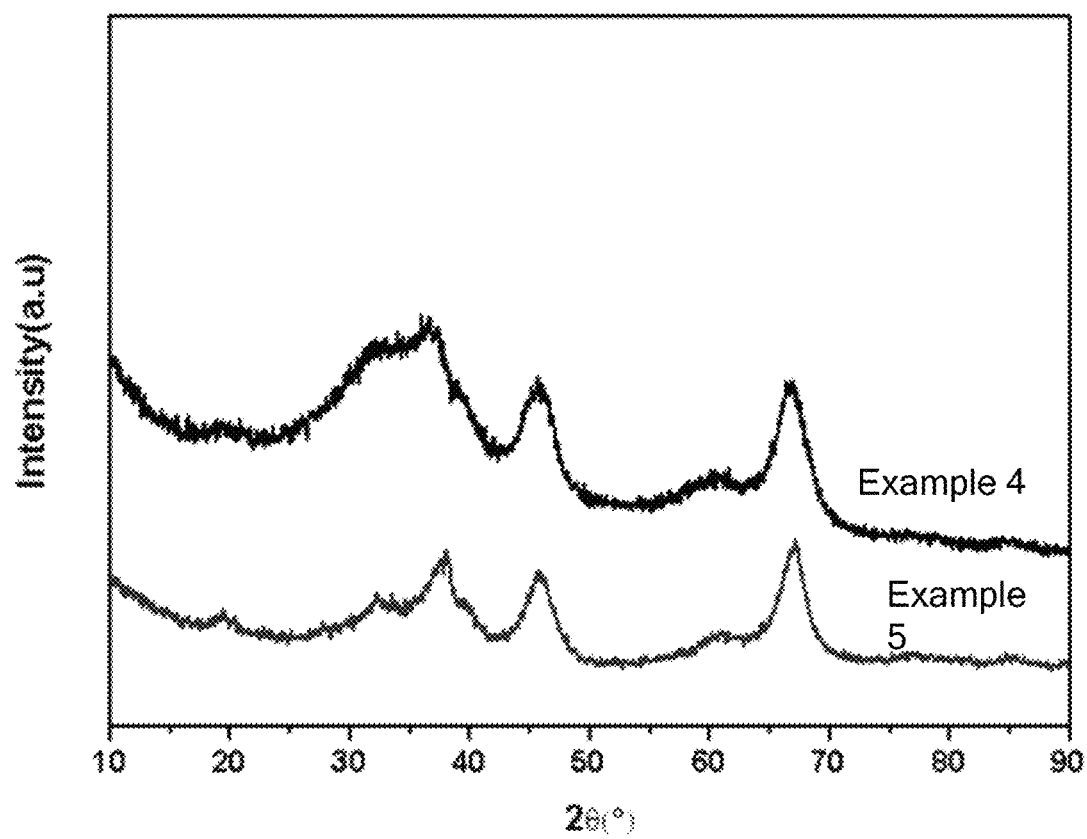
FIG. 1 shows an X-ray diffraction (XRD) pattern of hydroxyl nano-$Al_2O_3$ obtained in Examples 4 and 5.

The present disclosure provides a preparation method of nano-$Al_2O_3$ with a controllable hydroxyl content, including the following steps:

mixing a soluble aluminum salt and a pore-enlarging agent with a $H_2O_2$ solution, adjusting a pH value of a resulting mixture to 8 to 9 with an alkaline solution, and conducting precipitation to obtain a precipitate;

drying the precipitate to obtain an aluminum hydroxide precursor; and conducting roasting on the aluminum hydroxide precursor to obtain the nano-$Al_2O_3$; where the $H_2O_2$ solution has a concentration of 0 wt % to 36 wt %, and the nano-$Al_2O_3$ has a hydroxyl content positively correlated with the concentration of the $H_2O_2$ solution.

In the present disclosure, a soluble aluminum salt and a pore-enlarging agent are mixed with a $H_2O_2$ solution, a pH value of a resulting mixture is adjusted to 8 to 9 with an alkaline solution, and precipitation is conducted to obtain a precipitate. The soluble aluminum salt is preferably one or more selected from the group consisting of $Al(NO_3)_3 \cdot 9H_2O$, $Al(NO_3)_3 \cdot 6H_2O$, $NaAlO_2$, $AlPO_4$, $Al_2(SO_4)_3$, and $AlCl_3$, more preferably the $Al(NO_3)_3 \cdot 9H_2O$.

In the present disclosure, the pore-enlarging agent is preferably one or more selected from the group consisting of SDBS, trimethylbenzene, urea, and urotropine, more preferably the SDBS.

In the present disclosure, the $H_2O_2$ solution has a concentration of 0 wt % to 36 wt %, preferably 1 wt % to 30 wt %, more preferably 5 wt % to 25 wt %, and even more preferably 10 wt % to 20 wt %. The concentration of the $H_2O_2$ solution is adjusted according to the required hydroxyl content, and the hydroxyl content of the nano-$Al_2O_3$ is positively correlated with the concentration of the $H_2O_2$ solution. When the concentration of the $H_2O_2$ solution is 0, it means using water.

In the present disclosure, the mixture includes preferably 0.1 mol/L to 2 mol/L, more preferably 0.5 mol/L to 1.5 mol/L of the soluble aluminum salt by concentration. A higher concentration of the soluble aluminum salt means a greater mass of a precursor of the obtained aluminum hydroxide species, such that the loss of bound water can be reduced during drying, which is beneficial to obtain nano-$Al_2O_3$ with a high hydroxyl content.

In the present disclosure, the soluble aluminum salt and the pore-enlarging agent have a mass ratio of preferably 1:(0.0001-0.1), more preferably 1:(0.001-0.01).

In the present disclosure, there is no special requirement on a mixing method, and mixing methods well known to those skilled in the art can be used, such as mixing by stirring.

In the present disclosure, a pH value of a resulting mixture is adjusted to 8 to 9 with an alkaline solution, and precipitation is conducted to obtain a precipitate. In the alkaline solution, an alkaline substance is preferably one or more selected from the group consisting of NaOH, $NH_3 \cdot H_2O$, $(NH_4)_2CO_3$, KOH, and $Ba(OH)_2$, more preferably the $(NH_4)_2CO_3$. The alkaline solution has preferably 0.01 mol/L to 0.2 mol/L, more preferably 0.02 mol/L, 0.05 mol/L, 0.1 mol/L, or 0.2 mol/L of the alkaline substance by concentration. The alkaline solution is preferably added dropwise.

In the present disclosure, the alkaline solution includes preferably $H_2O_2$ with a concentration of preferably 0 wt % to 36 wt %, more preferably 5 wt % to 30 wt %, and even more preferably 10 wt % to 20 wt %.

In the present disclosure, the mixture is adjusted to a pH value of 8 to 9, preferably 8.2 to 8.8, more preferably 8.3 to 8.5 with the alkaline solution.

In the present disclosure, the precipitation is conducted preferably by standing at preferably a room temperature for preferably 0.5 d to 5 d, more preferably 1 d to 4 d, and even more preferably 2 d to 3 d. After the precipitation, solid-liquid separation is preferably conducted on an obtained precipitation reaction solution to obtain the precipitate; a method for the solid-liquid separation is preferably to pour a supernatant. Through the precipitation, a precursor of aluminum hydroxide species is obtained.

In the present disclosure, the precipitate is dried to obtain an aluminum hydroxide precursor. The drying is conducted at 90° C. to 110° C., more preferably 95° C. to 105° C., and even more preferably 100° C. for preferably 0.5 d to 14 d, more preferably 1 d to 10 d, and even more preferably 3 d to 5 d. The drying is conducted preferably in an oven. Through the drying, the aluminum hydroxide precursor is obtained, denoted as —$Al(OH)_3$; the aluminum hydroxide precursor includes an unshaped aluminum hydroxide structure and an aluminum sol.

In the present disclosure, roasting is conducted on the aluminum hydroxide precursor to obtain the nano-$Al_2O_3$. The roasting is conducted preferably in a muffle furnace at preferably 300° C. to 1,100° C., more preferably 500° C. to 1,000° C., and even more preferably 600° C. to 800° C. The roasting is conducted for preferably 3 h to 9 h, more preferably 4 h to 8 h, and even more preferably 5 h to 6 h. The roasting temperature is obtained by heating at preferably 5° C./min.

In the present disclosure, a crystal phase of the nano-$Al_2O_3$ is preferably regulated by controlling the roasting temperature. Specifically, when the roasting temperature is 300° C. to 450° C., the obtained nano-$Al_2O_3$ is in η-$Al_2O_3$; when the roasting temperature is 450° C. to 800° C., the obtained nano-$Al_2O_3$ is γ-$Al_2O_3$; when the roasting temperature is 800° C. to 1,100° C., the obtained nano-$Al_2O_3$ is θ-$Al_2O_3$; and when the roasting temperature is above 1,100° C., the obtained nano-$Al_2O_3$ is α-$Al_2O_3$.

In the present disclosure, during the roasting, the aluminum hydroxide precursor is converted into nano-alumina, while the bound water formed by the hydroxyl radicals during the drying is destroyed into hydroxyl groups.

In the present disclosure, after the roasting, a roasted product is preferably ground. There is no special requirement for a grinding method, and grinding methods well known to those skilled in the art can be used.

In the present disclosure, after the roasting, ultrasonic cleaning is preferably on the roasted product at 100 kHz to 200 kHz, more preferably 150 kHz for preferably 10 min to 2 h, more preferably 0.5 h to 1.5 h. The impurity ions on a surface of the nano-$Al_2O_3$ are removed by the ultrasonic cleaning.

The preparation method of nano-$Al_2O_3$ with a controllable hydroxyl content provided by the present disclosure are described in detail below with reference to the examples, but these examples may not be understood as a limitation to the protection scope of the present disclosure.

Example 1

A preparation method of nano-alumina with a controllable hydroxyl content included the following steps:

187.565 g of $Al(NO_3)_3 \cdot 9H_2O$ was mixed with 200 mg of SDBS, and dissolved in 1 L of a 35% $H_2O_2$ to obtain a mixed solution;

96 g of $(NH_4)_2CO_3$ was dissolved with 1 L of deionized water;

an obtained $(NH_4)_2CO_3$ solution was added dropwise to the mixed solution, and titrated to pH of 8.3;

a resulting suspension was allowed to stand for 1 d, and a supernatant was discarded, and the above process was repeated 3 times;

a remaining solid was dried in an oven at 90° C. for 3 d to obtain an —$Al(OH)_3$ precursor;

a dried —$Al(OH)_3$ precursor was directly roasted in a muffle furnace at 500° C. for 6 h without grinding, to obtain nano-γ-$Al_2O_3$ with multiple hydroxyl groups; and the nano-γ-$Al_2O_3$ with multiple hydroxyl groups was ground, subjected to ultrasonic cleaning with deionized water for 10 min, and filtered; the above process was repeated 3 times to obtain pure nano-γ-$Al_2O_3$ with multiple hydroxyl groups.

Example 2

A preparation method of nano-alumina with a controllable hydroxyl content included the following steps:

187.565 g of $Al(NO_3)_3 \cdot 9H_2O$ was mixed with 200 mg of SDBS, and dissolved in 1 L of a 17.5 wt % $H_2O_2$ to obtain a mixed solution;

96 g of $(NH_4)_2CO_3$ was dissolved with 1 L of deionized water;

an obtained $(NH_4)_2CO_3$ solution was added dropwise to the mixed solution, and titrated to pH of 8.3;

a resulting suspension was allowed to stand for 1 d, and a supernatant was discarded, and the above process was repeated 3 times;

a remaining solid was dried in an oven at 90° C. for 3 d to obtain an —$Al(OH)_3$ precursor;

a dried —$Al(OH)_3$ precursor was directly roasted in a muffle furnace at 500° C. for 6 h without grinding, to obtain nano-γ-$Al_2O_3$ with moderate hydroxyl groups; and the nano-γ-$Al_2O_3$ with moderate hydroxyl groups was ground, subjected to ultrasonic cleaning with deionized water for 10 min, and filtered; the above process was repeated 3 times to obtain pure nano-γ-$Al_2O_3$ with moderate hydroxyl groups.

Example 3

A preparation method of nano-alumina with a controllable hydroxyl content included the following steps:

187.565 g of $Al(NO_3)_3 \cdot 9H_2O$ was mixed with 200 mg of SDBS, and dissolved in 1 L of deionized water to obtain a mixed solution;

96 g of $(NH_4)_2CO_3$ was dissolved with 1 L of deionized water;

an obtained $(NH_4)_2CO_3$ solution was added dropwise to the mixed solution, and titrated to pH of 8.3;

a resulting suspension was allowed to stand for 1 d, and a supernatant was discarded, and the above process was repeated 3 times;

a remaining solid was dried in an oven at 90° C. for 3 d to obtain an —$Al(OH)_3$ precursor;

a dried —$Al(OH)_3$ precursor was directly roasted in a muffle furnace at 500° C. for 6 h without grinding, to obtain nano-γ-$Al_2O_3$ with less hydroxyl groups; and the nano-γ-$Al_2O_3$ with less hydroxyl groups was ground, subjected to ultrasonic cleaning with deionized water for 10 min, and filtered; the above process was repeated 3 times to obtain pure nano-γ-$Al_2O_3$ with less hydroxyl groups.

Example 4

18.75 g of $Al(NO_3)_3 \cdot 9H_2O$ was mixed with 20 mg of SDBS, and dissolved in 100 ml of a 35% $H_2O_2$ solution to obtain a mixed solution;

9.6 g of $(NH_4)_2CO_3$ was dissolved with 100 L of deionized water;

an obtained $(NH_4)_2CO_3$ solution was added dropwise to the mixed solution, and titrated to pH of 8.3;

a resulting suspension was allowed to stand for 1 d, and a supernatant was discarded, and the above process was repeated 3 times;

a remaining solid was dried in an oven at 90° C. for 1 d;

a dried —$Al(OH)_3$ precursor was directly roasted in a muffle furnace at 500° C. for 6 h without grinding, to obtain nano-γ-$Al_2O_3$; and the nano-γ-$Al_2O_3$ was ground, subjected to ultrasonic cleaning with deionized water for 10 min, and filtered; the above process was repeated 3 times to obtain pure nano-γ-$Al_2O_3$.

Example 5

18.75 g of $Al(NO_3)_3 \cdot 9H_2O$ was mixed with 20 mg of SDBS, and dissolved in 100 ml of deionized water to obtain a mixed solution;

9.6 g of $(NH_4)_2CO_3$ was dissolved with 100 L of deionized water;

an obtained $(NH_4)_2CO_3$ solution was added dropwise to the mixed solution, and titrated to pH of 8.3;

a resulting suspension was allowed to stand for 1 d, and a supernatant was discarded, and the above process was repeated 3 times;

a remaining solid was dried in an oven at 90° C. for 1 d;

a dried —$Al(OH)_3$ precursor was directly roasted in a muffle furnace at 500° C. for 6 h without grinding, to obtain nano-γ-$Al_2O_3$ with even less hydroxyl groups; and the nano-γ-Al$_2$O$_3$ with even less hydroxyl groups was ground, subjected to ultrasonic cleaning with deionized water for 10 min, and filtered; the above process was repeated 3 times to obtain pure nano-γ-Al$_2$O$_3$ with even less hydroxyl groups.

Example 6

40.95 g of NaAlO$_2$ was mixed with 100 mg of SDBS, and dissolved in 1 L of a 35% H$_2$O$_2$ to obtain a mixed solution;

40 g of NaOH was dissolved with 1 L of deionized water;

an obtained NaOH solution was added dropwise to the mixed solution, and titrated to pH of 9;

a resulting suspension was allowed to stand for 1 d, and a supernatant was discarded, and the above process was repeated 3 times;

a remaining solid was dried in an oven at 90° C. for 3 d;

a dried —Al(OH)$_3$ precursor was directly roasted in a muffle furnace at 500° C. for 6 h without grinding, to obtain nano-γ-Al$_2$O$_3$ with relatively more hydroxyl groups; and the nano-γ-Al$_2$O$_3$ with relatively more hydroxyl groups was ground, subjected to ultrasonic cleaning with deionized water for 10 min, and filtered; the above process was repeated 3 times to obtain pure nano-γ-Al$_2$O$_3$ with relatively more hydroxyl groups.

The XRD patterns of nano-Al$_2$O$_3$ obtained in Examples 4 and 5 were shown in FIG. 1. It was seen from FIG. 1 that the Al$_2$O$_3$ obtained in the present disclosure were all in the same crystal phase, that is, γ-Al$_2$O$_3$.

Figure 2:
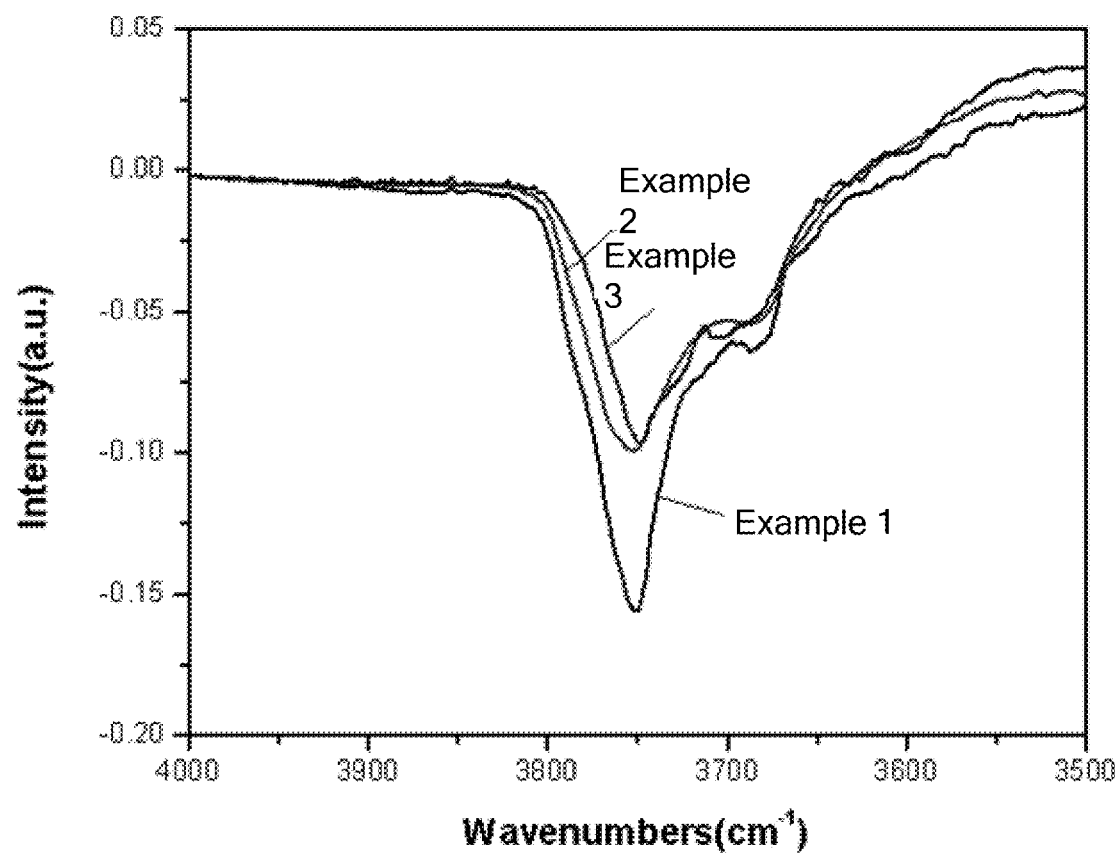
FIG. 2 shows a contrast of a hydroxyl content of the hydroxyl nano-$Al_2O_3$ obtained in Examples 1 to 3.

The hydroxyl contents of the nano-Al$_2$O$_3$ obtained in Examples 1 to 3 were tested by in situ diffuse reflectance infrared Fourier transform spectroscopy (DRIFTs), and the results were shown in FIG. 2. Since hydroxyl groups could effectively combine with NH$_3$ to form NH$_4^+$, within the wavelength range of 4,000 cm$^{-1}$ to 3,500 cm$^{-1}$ in this spectrum, the more NH$_3$ adsorption led to a greater loss of hydroxyl peaks, indicating a greater hydroxyl content. It was seen from FIG. 2 that with the increase of the concentration of H$_2$O$_2$ solution, the hydroxyl content of the nano-Al$_2$O$_3$ increased.

Figure 3:
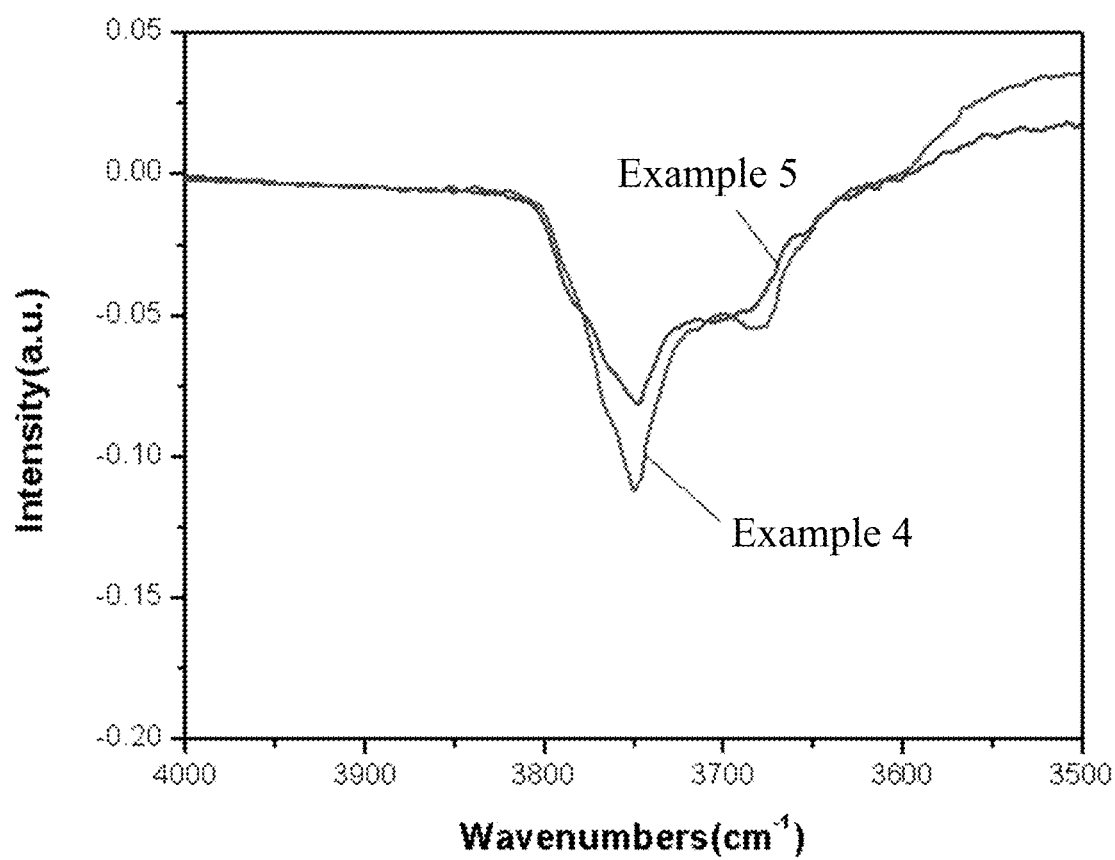
FIG. 3 shows a contrast of a hydroxyl content of the hydroxyl nano-$Al_2O_3$ obtained in Examples 4 and 5.

The hydroxyl contents of nano-Al$_2$O$_3$ obtained in Examples 4 to 5 were shown in FIG. 3. Due to the small synthesis amount of nano-Al$_2$O$_3$, bound water was also easily lost during the drying. However, the content of hydroxyl groups on γ-Al$_2$O$_3$ could still be controlled by adjusting the amount of H$_2$O$_2$ added. The more H$_2$O$_2$ meant the more abundant hydroxyl groups.

The hydroxyl nano-γ-Al$_2$O$_3$ obtained in Examples 1, 2, and 5 were loaded with 10 wt % Ag nanoparticles to obtain an Ag-supported catalyst.

Figure 4:
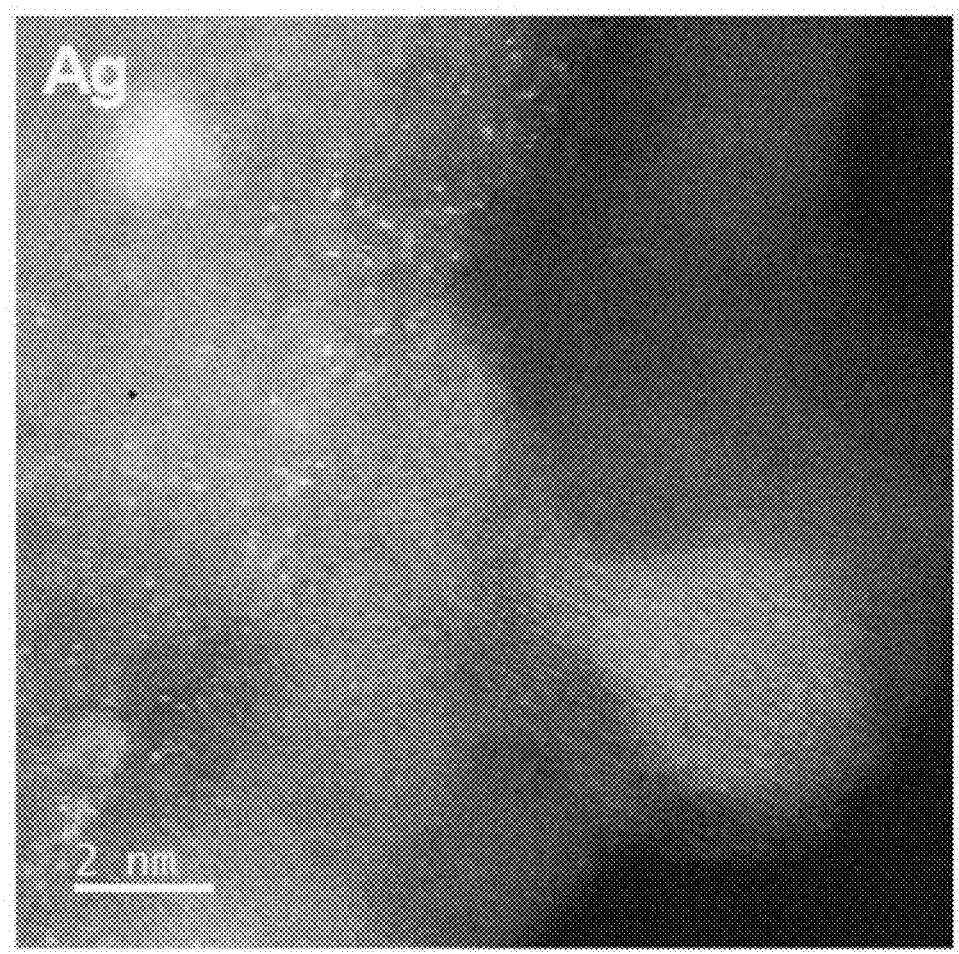
FIG. 4 shows a transmission electron microscopy (TEM) image of the hydroxyl nano-$Al_2O_3$ load with a 10 wt % Ag catalyst obtained in Example 1.

The TEM image of the Ag-supported catalyst obtained in Example 1 was shown in FIG. 4. It was seen from FIG. 4 that Ag was anchored on γ-Al$_2$O$_3$ in the form of a single atom in the figure without large Ag nanoparticles. Since Ag atoms could be anchored on γ-Al$_2$O$_3$ through hydroxyl groups, if the hydroxyl groups were abundant enough, Ag was not easy to agglomerate to form nanoparticles. The more hydroxyl groups, the better the dispersion of Ag and the easier it was to exist in the form of single atoms; the fewer hydroxyl groups, the fewer anchor sites that the γ-Al$_2$O$_3$ surface could provide to Ag, such that Ag atoms were easy to aggregate to form nanoparticles.

Figure 5:
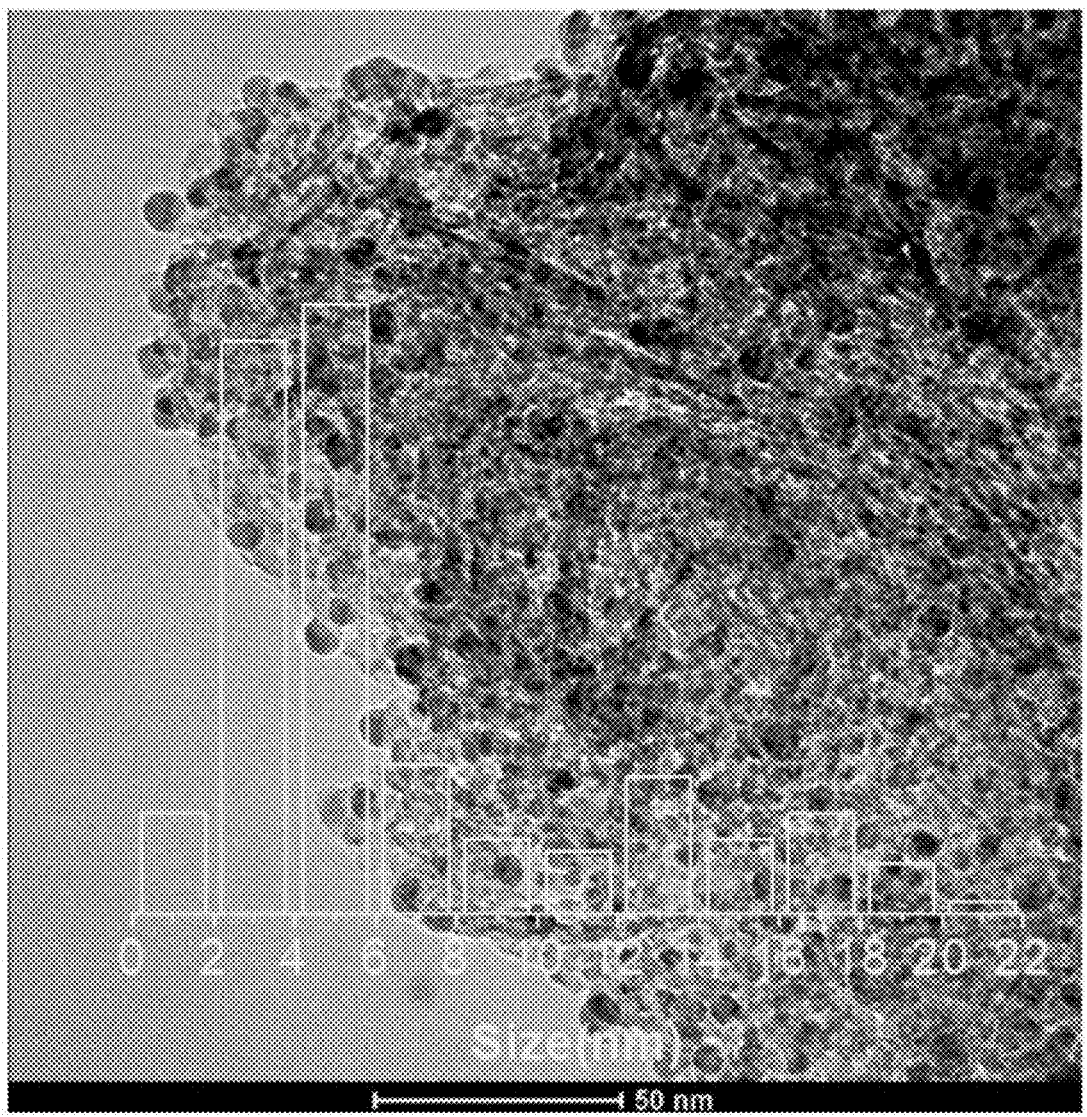
FIG. 5 shows a TEM image of the hydroxyl nano-$Al_2O_3$ load with a 10 wt % Ag catalyst obtained in Example 2.

The TEM image of the Ag-supported catalyst obtained in Example 2 was shown in FIG. 5. It can be seen from FIG. 5 that due to the limited content of hydroxyl groups, the nano-Al$_2$O$_3$ could not provide the components with anchoring sites. Therefore, Ag atoms that could not be anchored by hydroxyl groups were aggregated into nanoparticles within a certain particle size (from 1 nm to 22 nm, mainly including Ag nanoparticles of 5 mm).

Figure 6:
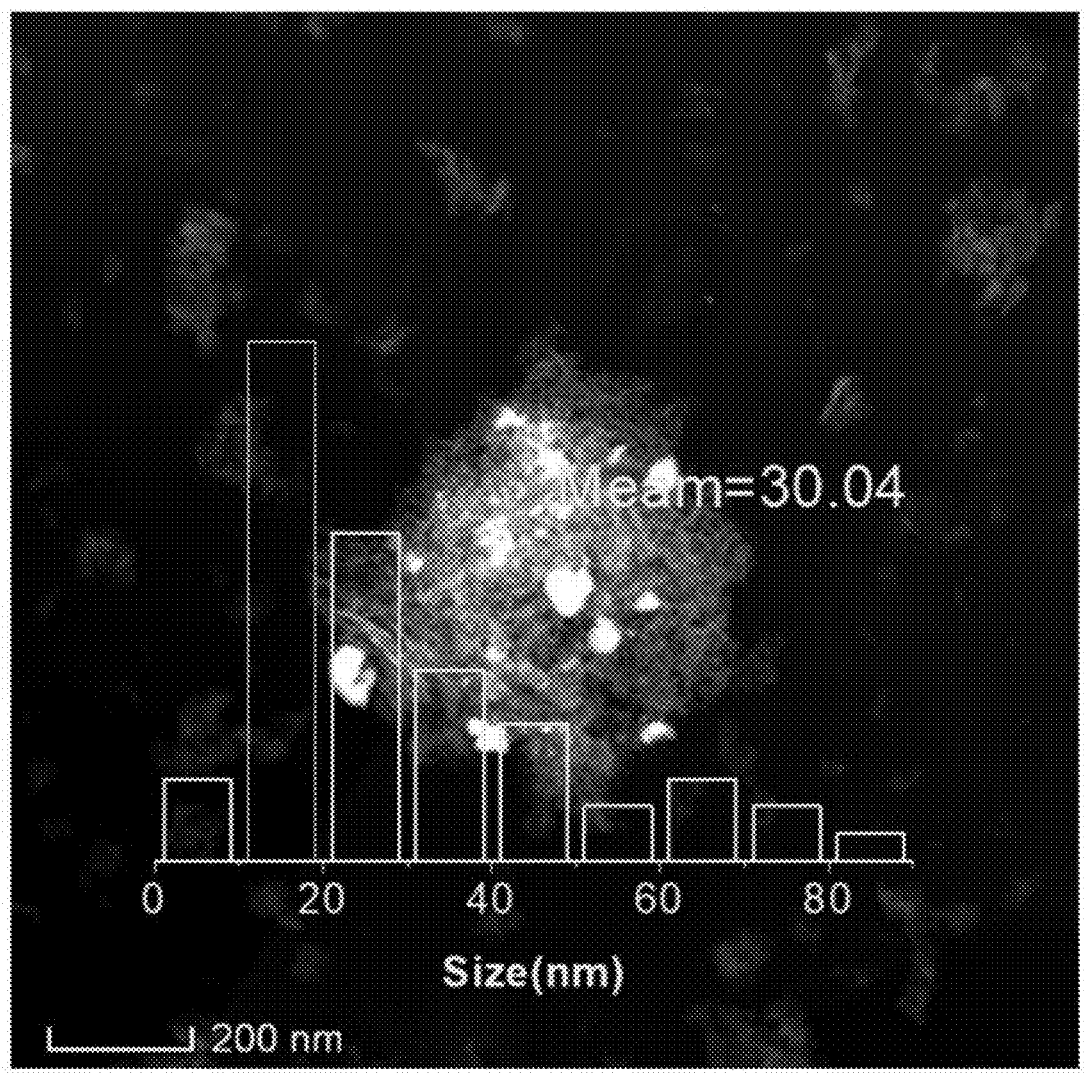
FIG. 6 shows a TEM image of the hydroxyl nano-$Al_2O_3$ load with a 10 wt % Ag catalyst obtained in Example 5.

The TEM image of the Ag-supported catalyst obtained in Example 5 was shown in FIG. 6. As shown in FIG. 6, due to the less hydroxyl content, the nano-Al$_2$O$_3$ obtained in Example 5 was less likely to provide sufficient Ag anchoring sites, such that Ag atoms were agglomerated in large numbers to form nanoparticles with an average particle size of 30 nm.

Use Example 1

Figure 7:
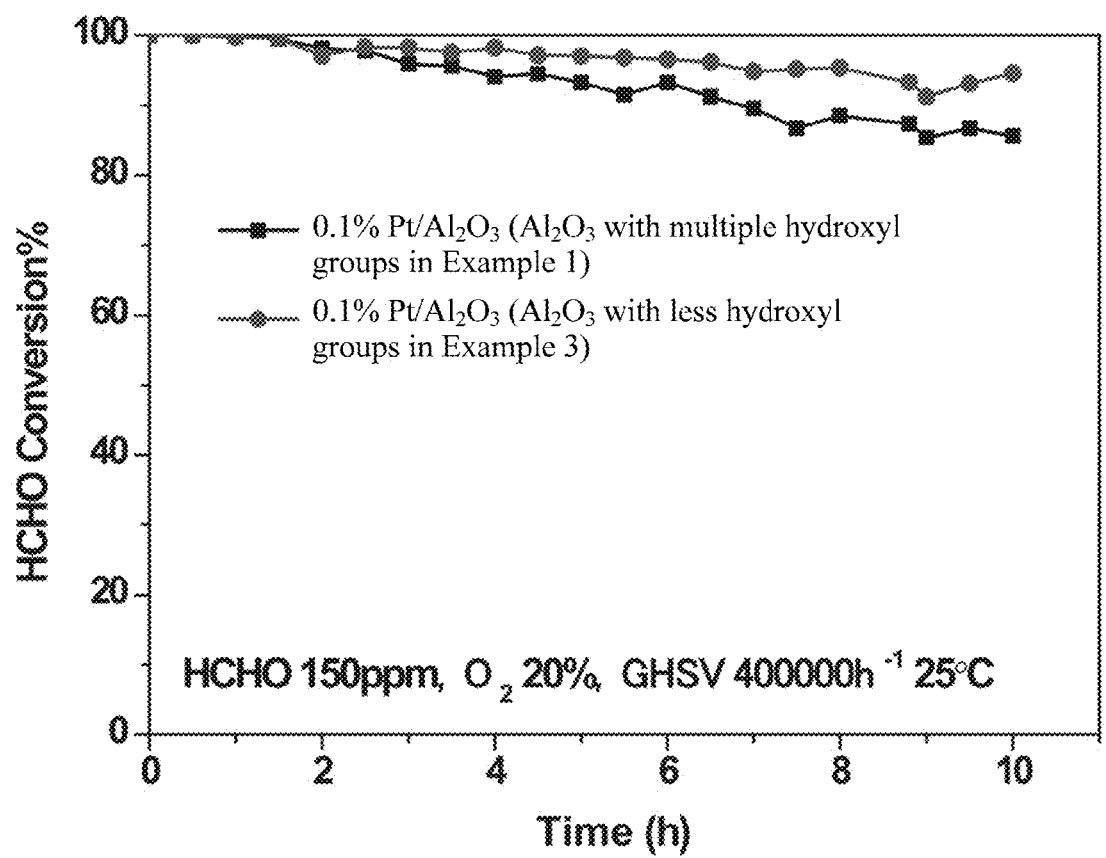
FIG. 7 shows a catalytic effect of 0.1 wt % Pt-supported catalysts of Examples 1 and 3.

Using 0.1 wt % Pt loaded with each of Example 1 (Al$_2$O$_3$ with multiple hydroxyl groups) and Example 3 (Al$_2$O$_3$ with less hydroxyl groups), catalytic oxidation was conducted on formaldehyde at a room temperature, and the results were shown in FIG. 7. The Al$_2$O$_3$ with multiple hydroxyl groups was beneficial to Pt dispersion due to more hydroxyl groups, and the active center of formaldehyde catalysis was isolated Pt atoms. Therefore, the Al$_2$O$_3$ with multiple hydroxyl groups was beneficial to the oxidation of formaldehyde by Pt atoms. However, the Al$_2$O$_3$ with less hydroxyl groups was not conducive to the dispersion of Pt, and there was less Pt existing as a single atom on the surface of Al$_2$O$_3$, resulting in a poor oxidation effect on formaldehyde. (Reaction conditions were: HCHO=150 ppm, 20% O$_2$, at a room temperature, GHSV=120,000 h$^{-1}$).

Use Example 2

Figure 8:
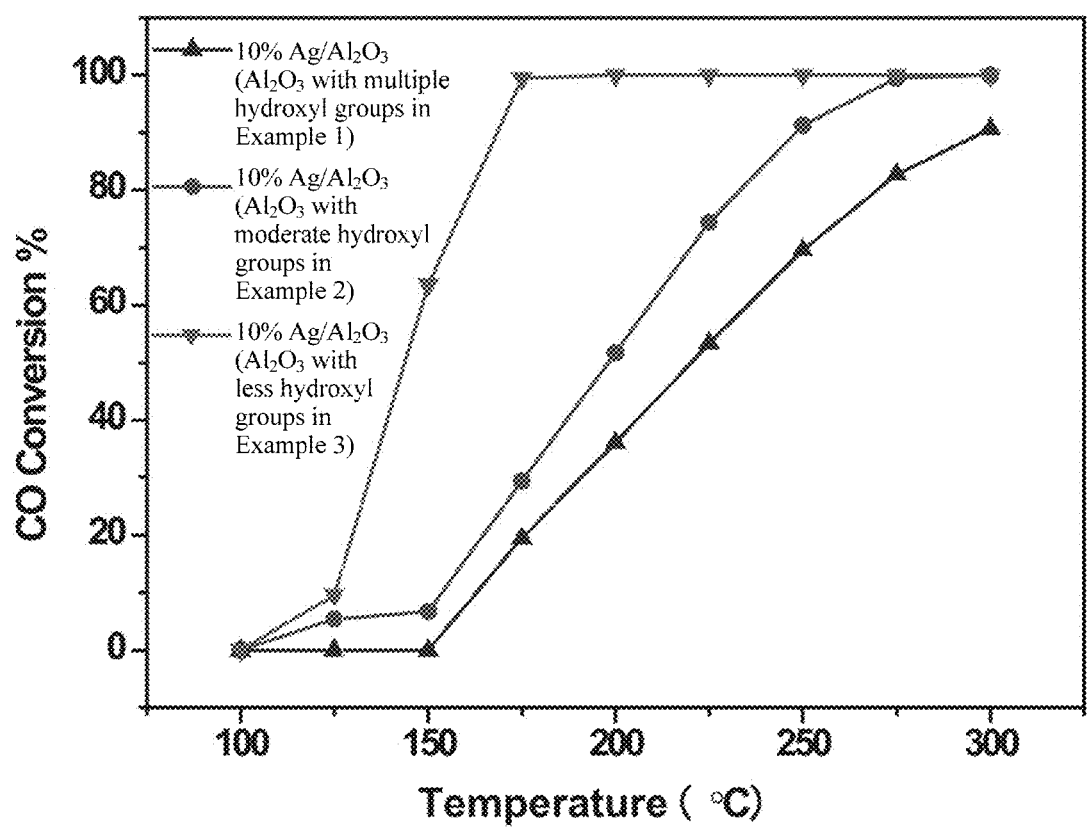
FIG. 8 shows a catalytic effect of 10 wt % Ag-supported catalysts of Examples 1 to 3.

Using 10 wt % Ag loaded with each of Example 1 (Al$_2$O$_3$ with multiple hydroxyl groups), Example 2 (Al$_2$O$_3$ with moderate hydroxyl groups), and Example 3 (Al$_2$O$_3$ with less hydroxyl groups), catalytic oxidation was conducted at 100° C. to 300° C. on CO. The results were shown in FIG. 8. The active center of CO catalytic oxidation was Ag nanoparticles. Therefore, in the three kinds of Al$_2$O$_3$ with different hydroxyl contents, the Al$_2$O$_3$ with less hydroxyl groups was not conducive to the dispersion of Ag atoms and made them agglomerate to form nanoparticles; while Ag on the Al$_2$O$_3$ with multiple hydroxyl groups was well dispersed and existed on the surface of Al$_2$O$_3$ in the form of isolated atoms. Therefore, Example 3 loaded with the same mass of Ag atoms showed a better CO catalytic oxidation activity. (Reaction conditions were: CO=500 ppm, 10% O$_2$, GHSV=120,000 h$^{-1}$).

Use Example 3

Figure 9:
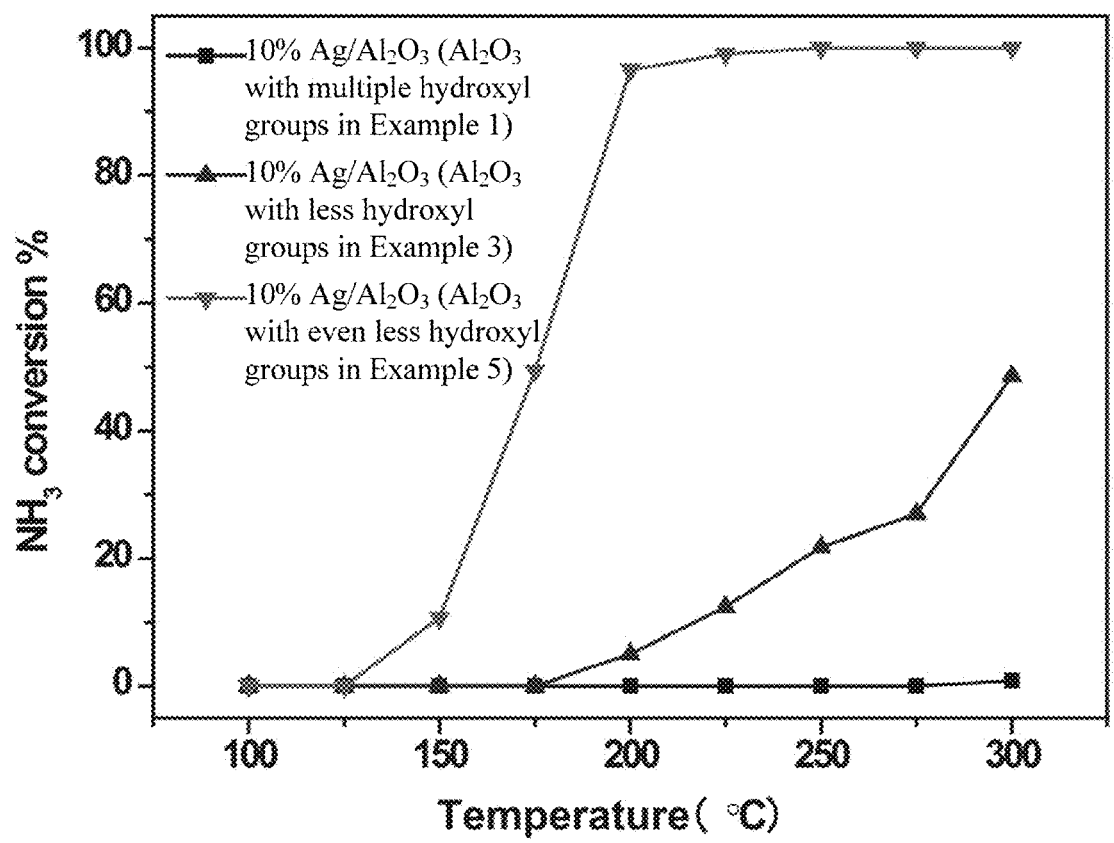
FIG. 9 shows a catalytic effect of 10 wt % Ag-supported catalysts of Examples 1, 3 and 5.

Using 10 wt % Ag loaded with each of Example 1 (Al$_2$O$_3$ with multiple hydroxyl groups), Example 3 (Al$_2$O$_3$ with less hydroxyl groups), and Example 5 (Al$_2$O$_3$ with less hydroxyl groups), selective catalytic oxidation was conducted at 100° C. to 300° C. on NH$_3$. The results were shown in FIG. 9. The active center of NH$_3$ catalytic oxidation was Ag nanoparticles. Therefore, in the three kinds of Al$_2$O$_3$ with different hydroxyl contents, the Al$_2$O$_3$ with less hydroxyl groups was not conducive to the dispersion of Ag atoms and made them agglomerate to form nanoparticles; while Ag on the Al$_2$O$_3$ with multiple hydroxyl groups was well dispersed and existed on the surface of Al$_2$O$_3$ in the form of isolated atoms. Therefore, Example 5 (the Al$_2$O$_3$ synthesized in Example 5 had surface hydroxyl groups less than that of Example 3) loaded with the same mass of Ag atoms shows a better NH$_3$ catalytic oxidation activity. (Reaction conditions were: $NH_3$=500 ppm, 10% $O_2$, GHSV=120,000 $h^{-1}$).

Use Example 4

Figure 10:
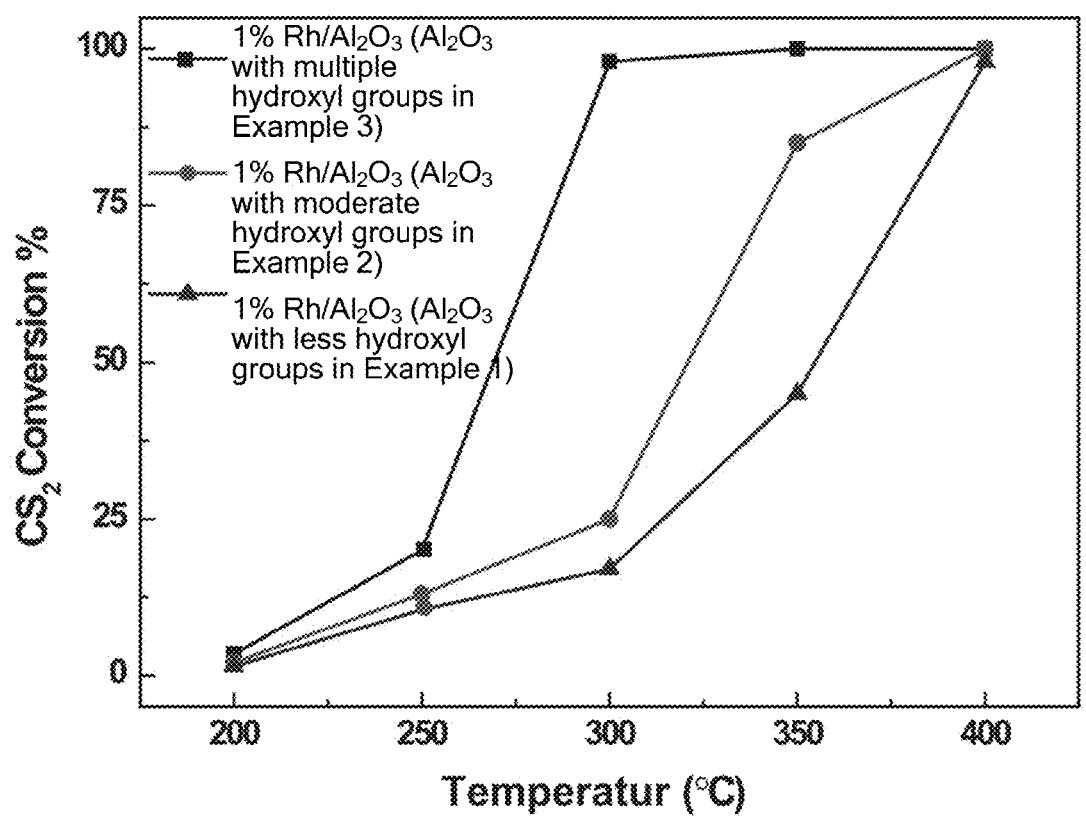
FIG. 10 shows a catalytic effect of 1 wt % Rh-supported catalysts of Examples 1 to 3.

Using 1 wt % Rh loaded with each of Example 1 ($Al_2O_3$ with multiple hydroxyl groups), Example 2 ($Al_2O_3$ with moderate hydroxyl groups), and Example 3 ($Al_2O_3$ with less hydroxyl groups), catalytic hydrogenation was conducted at 200° C. to 400° C. on $CS_2$. The results were shown in FIG. 10. The active center of $CS_2$ catalytic hydrogenation was Rh nanoparticles. Therefore, in the three kinds of $Al_2O_3$ with different hydroxyl contents, the $Al_2O_3$ with less hydroxyl groups was not conducive to the dispersion of Rh atoms and made them agglomerate to form nanoparticles; while Rh on the $Al_2O_3$ with multiple hydroxyl groups was well dispersed and existed on the surface of $Al_2O_3$ in the form of isolated atoms. Therefore, Example 3 loaded with the same mass of Rh atoms showed a better $CS_2$ catalytic hydrogenation activity. (Reaction conditions were: $CS_2$=200 ppm, 10% $H_2$, GHSV=120,000 $h^{-1}$).

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of nano-aluminum oxide (nano-$Al_2O_3$) with a controllable hydroxyl content, comprising the following steps:

mixing a soluble aluminum salt and a pore-enlarging agent with an $H_2O_2$ solution, adjusting a pH value of a resulting mixture to 8 to 9 with an alkaline solution, and conducting precipitation to obtain a precipitate;

drying the precipitate to obtain an aluminum hydroxide precursor; and conducting roasting on the aluminum hydroxide precursor to obtain the nano-$Al_2O_3$; wherein the pore-enlarging agent is one or more selected from the group consisting of sodium dodecyl benzene sulfonate (SDBS), trimethylbenzene, and urotropine; and the $H_2O_2$ solution has a concentration of 1 wt % to 36 wt %, and the nano--$Al_2O_3$ has a hydroxyl content that is controlled by adjusting the concentration of the $H_2O_2$ solution.

2. The preparation method according to claim 1, wherein the alkaline solution comprises $H_2O_2$ with a concentration of 0 wt % to 36 wt %.

3. The preparation method according to claim 1, wherein the soluble aluminum salt is one or more selected from the group consisting of $Al(NO_3)_3 \cdot 9H_2O$, $Al(NO_3)_3 \cdot 6H_2O$, $NaAlO_2$, $AlPO_4$, $Al_2(SO_4)_3$, and $AlCl_3$.

4. The preparation method according to claim 1, wherein a mass ratio of the soluble aluminum salt to the pore-enlarging agent is in a range of 1:0.0001 to -1:0.1.

5. The preparation method according to claim 1, wherein the precipitation is conducted for 0.5 days to 5 days.

6. The preparation method according to claim 1, wherein the drying is conducted at 90° C. to 110° C. for 0.5 days to 14 days.

7. The preparation method according to claim 1, wherein the roasting is conducted at 300° C. to 1,100° C. for 3 hours to 9 hours.

8. The preparation method according to claim 1, further comprising conducting ultrasonic cleaning on a roasted product at 100 kHz to 200 kHz for 10 minutes to 2 hours.

9. The preparation method according to claim 1, wherein the mixture of the soluble aluminum salt, the pore-enlarging agent, and the $H_2O_2$ solution has 0.1 mol/L to 2 mol/L of the soluble aluminum salt by concentration.

10. The preparation method according to claim 9, wherein a mass ratio of the soluble aluminum salt to the pore-enlarging agent is in a range of 1:0.0001 to -1:0.1.

* * * * *